Dec. 2, 1958   R. C. ZEIDLER ET AL   2,862,398
TRANSMISSION
Filed Feb. 24, 1955   2 Sheets-Sheet 1

Inventors:
Reinhold C. Zeidler
and Claude H. Nickell
By: H. J. Schmid
Atty.

Dec. 2, 1958    R. C. ZEIDLER ET AL    2,862,398
TRANSMISSION
Filed Feb. 24, 1955    2 Sheets-Sheet 2
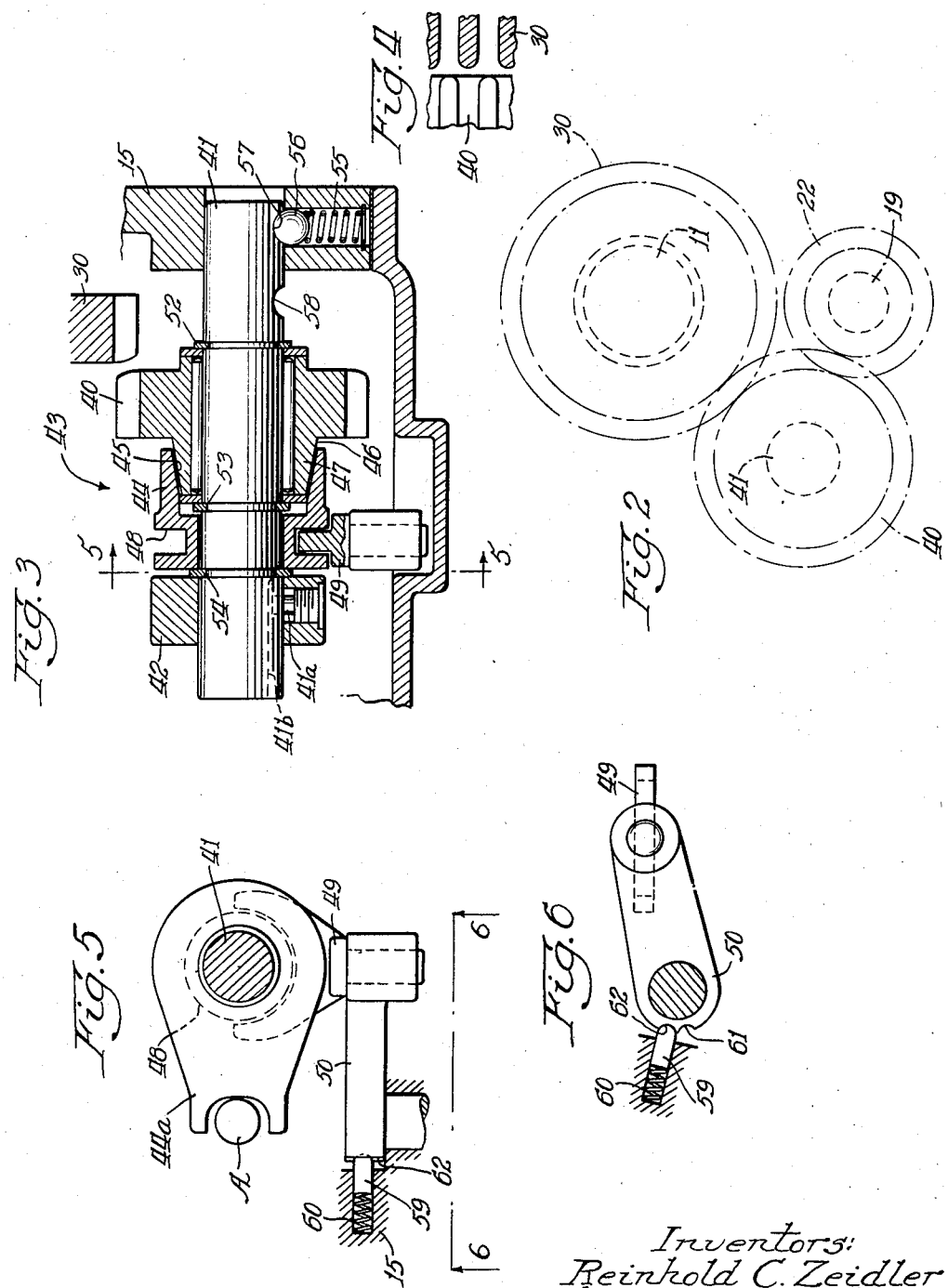
Inventors:
Reinhold C. Zeidler
and Claude H. Nickell
By: [signature]
Atty.

United States Patent Office 2,862,398
Patented Dec. 2, 1958

2,862,398

TRANSMISSION

Reinhold C. Zeidler, Detroit, and Claude N. Nickell, Dearborn, Mich., assignors to Borg-Warner Corporation, Chicago, Ill., a corporation of Illinois Application February 24, 1955, Serial No. 490,182

10 Claims. (Cl. 74—339)

This invention relates to transmissions, and more particularly to transmissions of the countershaft type having synchronizing devices for causing a pair of relatively rotatable toothed elements, such as gears, to approach the same speed before they are moved into, or just prior to being moved into, meshing or driving relation.

An object of the invention is to provide an improved transmission of the countershaft type, including synchronizing means for relatively rotatable meshing gears thereof.

Another object of the invention is to provide an improved synchronizing device for use in power transmissions having relatively shiftable power elements, such as gears, designed for relative movement along different axes of rotation into intermeshing relation.

Another object of the invention is to provide a transmission of the countershaft type, wherein the reverse gear drive train includes meshed drive and reverse idler gears, the reverse idler gear being meshable with a driven gear to provide reverse drive.

Another object of the invention is to provide an improved synchronizing device, including a friction engaging means having one friction braking element rotatable to a limited degree on a shaft and axially movable thereon to engage the other coacting member on a gear, upon movement of the shaft, to move and mesh the gear with a gear rotatable about an axis in spaced relation to the axis of the shaft.

A further object of the invention is to provide, in a synchronizing device as described, detent mechanism for providing resistance to shifting movement of the movable gear and release of resistance when the gears are meshed, and to function to lock the meshed gears against accidental displacement and to prevent also accidental meshing of the gears.

Various other objects and advantages of the invention will be obvious from an inspection of the accompanying drawing, and is more fully set forth in the following description, and the invention also consists of certain new and novel features of construction and combination of parts hereinafter set forth in the claims.

In the accompanying drawing:

Fig. 2 is a transverse section of the transmission of Fig. 1, said section being taken on the line 2—2 of Fig. 1, and illustrating the reverse gear drive train;

Fig. 3 is a sectional view of a portion of the reverse gear drive train and illustrating our improved synchronizer device;

Fig. 4 is a view illustrating adjacent portions of the teeth of the gears shown in Fig. 3;

Fig. 5 is the control mechanism for the synchronizer device and reverse gear drive train taken on the lines 5—5 of Fig. 3; and Fig. 6 is a bottom view of the control mechanism shown in Fig. 5 and taken on the line 6—6 of Fig. 5.

Figure 1:
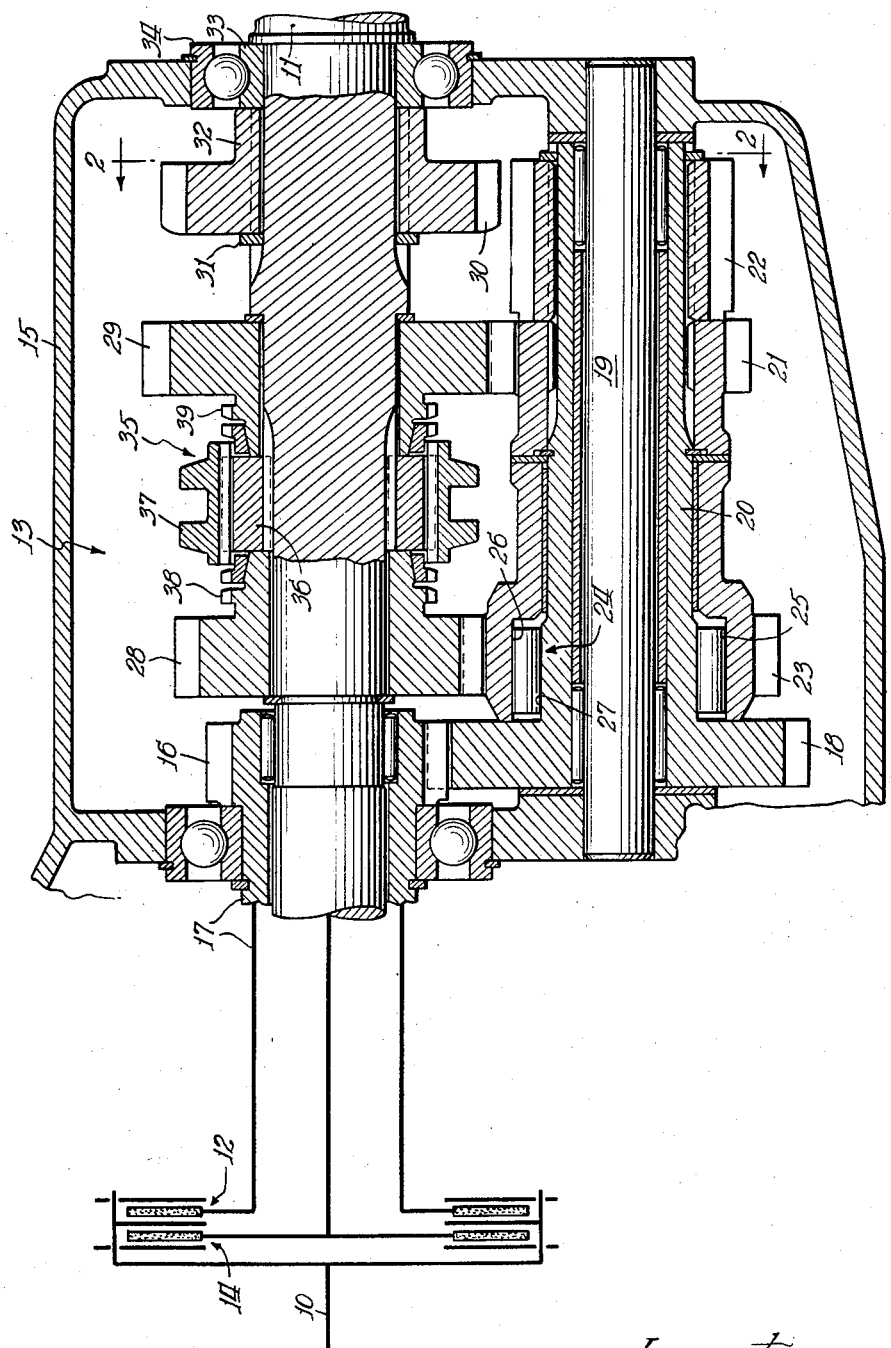
Fig. 1 is the longitudinal sectional view of a transmission embodying the invention, portions of the transmission being shown schematically.

Referring to Fig. 1, the transmission illustrated comprises a drive shaft 10, a driven shaft 11, a friction clutch generally identified and diagrammatically shown at 12 for connecting the drive shaft 10 to a countershaft type of gear set illustrated generally at 13 and providing a plurality of reduction gear power trains from the drive shaft 10 to the driven shaft 11. The transmission also comprises a clutch generally indicated and diagrammatically shown at 14 for connecting the drive shaft directly to the driven shaft 11.

The gear set 13 is disposed within a transmission casing, indicated at 15, and the gear set comprises a drive gear indicated at 16 connected to an intermediate sleeve shaft 17 adapted to be coupled to the drive shaft 10 by the clutch 12. The drive gear 16 has its teeth meshing with the teeth of a gear 18 for transmitting drive to the countershaft gear cluster rotatably mounted on the countershaft 19 and comprising the gear 18 having integrally formed therewith a sleeve 20, to which is splined a gear 21 and gear 22, whereby, upon rotation of the drive gear 16 and gear 18, the sleeve 20 will rotate to drive the gears 21 and 22. Rotatably mounted on the sleeve shaft 20 is a gear 23 adapted to be drivingly connected to the sleeve shaft by a one-way clutch generally indicated at 24, and comprising rollers 25 disposed between an outer race 26, defined by the inner surface of the gear 23 and an inner race 27 provided by the outer surface of the sleeve shaft 20. The gear set 13 further comprises gears 28 and 29 rotatably mounted on the driven shaft 11 and a gear 30 splined to and rotatable with the driven shaft 11, the gear 30 being fixed against axial movement on the shaft 11 by a ring 31 and an extension 32 abutting against the inner collar 33 fixed to the driven shaft 11 and forming the inner race for a ball bearing arrangement 34 rotatably mounting the driven shaft 11.

Disposed between the gears 28 and 29 is a positive clutch of a well-known synchronizer type and generally indicated at 35, and comprising a hub 36 splined to the drive shaft 11, and a shiftable collar 37 movable axially of the driven shaft 11 and having internal teeth adapted to mesh with teeth 38 on the gear 28, when the collar 37 is moved to the left, as shown in Fig. 1; the teeth of the shiftable collar 37 engaging teeth 39 on the gear 29 upon movement of the collar 37 toward the right, these movements of the collar 37 acting to provide a plurality of different speed ratio reduction gear trains. It will be noted that the gear 29 meshes with the gear 21, so that upon movement of the collar 37 to engage the teeth 39 on the gear 29, drive will be transmitted from the countershaft gear 21 to the gear 29 and through the positive clutch to the driven shaft. Engagement of the teeth 37 with the teeth 38 on the gear 28 will provide a drive from the gear 23 to the gear 28 and through the positive clutch to the driven shaft 11.

The gears 30 and 22 provide a portion of a reverse drive gear train, including, in addition to the gears 22 and 30, a gear 40 shown in Figs. 2 and 3, the gear 40 being in constant mesh with the gear 22 which is of considerable axial extent, as shown in Fig. 1, to permit sliding movement of the gear 40, while maintaining its teeth in engagement with the teeth on the gear 22, for the purpose of engaging the teeth on the gear 30 to provide a reverse gear drive train. As shown in Fig. 3, the gear 40 is rotatably mounted on a shaft 41 having its opposite ends respectively received within the end wall of the casing 15 and an extension 42 of the casing 15. As shown in Fig. 2, the shafts 41, 11 and 19 are disposed with their axes spaced from each other and parallel to each other.

In the operation of the transmission to obtain a first or low speed ratio gear train, the shiftable collar 37 of the positive clutch 35 is moved to the right to engage the teeth 39 on the gear 29 and the clutch 12 is engaged. The low speed power train thus established comprises the drive shaft 10, engaged clutch 12, engaged gears 16 and 18, the sleeve shaft 20, gear 21, gear 29, and through the positive clutch 35 to the driven shaft 11.

To obtain the second speed ratio gear train, the clutch 12 is disengaged, and the shiftable collar 37 of the positive clutch 35 is moved to the left to engage the teeth 38 on the gear 28, and the clutch 12 is then re-engaged. This second speed power train comprises the drive shaft, the engaged friction clutch 12, gears 16 and 18, sleeve 20, the engaged one-way clutch 24 rotating the gear 23 meshing with the gear 28, and through the positive clutch 35 to the driven shaft 11.

To obtain the third speed or high speed ratio power train of the transmission, the clutch 14 is engaged to directly connect the shafts 10 and 11. As the driven shaft 11 is driven faster than the second speed ratio gear train, the one-way clutch 24 will disengage to release drive of the second speed ratio gear train. It will be apparent that, upon release of the friction clutch 14, the second speed gear train will become immediately effective through the operation of the one-way clutch 24, which will then engage to provide the second speed gear train.

To obtain reverse drive, the gear 40, in constant mesh with the gear 22, is moved to the right as shown in Fig. 3 to engage its teeth with the teeth on the gear 30 and the clutch 12 is engaged. This reverse drive power train comprises the drive shaft 10, the engaged friction clutch 12, gears 16 and 18, sleeve shaft 20, gear 22 meshing with gear 40, and the gear 40, meshing with the gear 30 splined to the driven shaft, is thereby effective to drive the driven shaft 11 reversely to the direction of rotation of the drive shaft 10.

An important feature of the present invention is the synchronizing device generally indicated at 43 and having for its purpose the smooth coupling action of the teeth on the gear 40 with the teeth on the gear 30 to establish a reverse drive train, particularly when it is necessary to rock the car by engaging and disengaging the first speed ratio drive train and reverse drive train in snow or mud. In the event the friction clutch 12 operates in an oil bath, the disengaged rotating clutch may still be effective to transmit torque from the engine slightly through the rotating oil to the countershaft gears 20 and 22 of the gear trains, due to the constant coupling of the gears 21 and 22 by the shaft 19, to the gears 16 and 18. Another factor is, some spin, due to the inertia of the rotating parts, will also impart rotation to the meshed gears. Unless the rotation of the parts is stopped or slowed down appreciably, difficulty is encountered in engaging the gears 40 and 30. The synchronizing device 43 effectively prevents clashing and possible breakage of the teeth of the gears 40 and 30, and can be considered to be a brake for the driven plate of the clutch 12 and the connecting gears.

Referring to Figs. 3 and 4, this synchronizing device 43 comprises a friction engaging device including a friction braking element 44 having an internal conical friction surface 45 adapted to engage an external conical surface 46 formed on the element 47 rigid with the hub of the gear 40, the friction braking element 44 being rotatably mounted to a limited degree on the shaft 41, and having an annular groove 48 for reception of a shift fork 49 rotatably mounted in the casing 15, and rotatable by a lever 50 under the control of the driver. As seen in Fig. 5, the braking element 44 has an extension 44a provided with an arcuate recess receiving a reaction shaft A fixed to the transmission casing, the recess being larger than the diameter of the shaft A to allow limited rotation of the braking element 44. Gear 40 is prevented against axial movement relative to the shaft 41 by the provision of snap rings 52 and 53 disposed on opposite sides of the gear 40 and received within grooves in the shaft 41. The braking element 44 has disposed on opposite sides thereof the snap ring 53 and a snap ring 54, the rings 53 and 54 being disposed in grooves in the stub shaft 41 a sufficient distance apart to provide a lost motion connection between the braking element 44 and shaft 41 by allowing slight axial movement of the braking element 44 relative to the shaft 41. The shaft 41 is movable along its axis, but is prevented from rotation by means of a screw 41a threaded into an opening in the casing portion 42 and received within a slot 41b in the shaft 41.

In the operation of the synchronizing device, rotation of the lever 50 by the driver will effect movement of the fork 49 to move the braking element 44 toward the right to engage its friction surface 45 with the surface 46 on the element 47 integral with the gear 40. A detent mechanism provides yielding resistance to movement of the element 47 and is in the form of a spring 55, received within a bore in the casing 15 and compressed between a ball 56 and the bottom wall of the casing to urge the ball into a notch 57 in the shaft 41. Thus, engagement of the braking element 44 and the element 47 will cause the speed of the gear 40 to decrease and thereby the gear 22 in mesh therewith, so that, upon further rotation of the lever 50, the braking element 44 and the element 47, together with the gear 40, will be moved to the right, and the gear 40 will move the stub shaft 41 in this direction. Upon the engagement of the braking element 44 and the element 47, and assuming the gear 30 is rotating in either direction, the speed of the gear 40 will be decreased to an extent that, at some point, its speed will be substantially the same speed as the gear 30 and the teeth on the gear 40 will mesh with the gear 30 without clash to provide a drive from the gear 22 to the gear 40 and thence to the gear 30 coupled to the driven shaft 11 for driving the driven shaft 11 reversely to the direction of rotation of the shaft 10. Disengagement of this reverse drive gear train may be readily accomplished by rotation of the lever 50 in the direction opposite to that for engaging the gears 40 and 30, to cause the braking element 44 to be moved to the left and out of engagement with the element 47 of the gear 40, and, upon further movement, the braking element 44 will contact the snap ring 54 to move the shaft 41 to the left, and thereby the gear 40, through the medium of the snap rings 52 and 53, out of engagement with the gear 30. It will be apparent that, upon engagement of the gears 30 and 40 and relaxing of driver effort to move the braking element 44 to the right, the braking element 44 will disengage from the element 47 due to the slight axial displacement of the braking element 44 relative to the stub shaft 41, whereby the element 47 and the gear 40 may rotate freely with respect to the braking element 44.

To insure that the teeth of the gears 30 and 40 will easily mesh during operation of the synchronizer, the adjacent ends of the teeth of these gears are rounded and sufficient clearance is provided between the braking element 44 and the shaft A to allow gear 40 to rotate a limited amount in either of opposite directions to mesh the teeth of the gears 30 and 40.

Describing the detent mechanism more particularly, this mechanism is effective to provide resistance to the shifting movement of the movable gear 40, and release of the resistance when the gear 40 and gear 30 are in meshed engagement, the detent mechanism also functioning to lock the meshed gears against accidental displacement, and to prevent accidental meshing of the gears. The coil spring 55 is normally under compression to effect actuation of the ball 56 into the notch 57 in stub shaft 41 to prevent accidental meshing of the gears as illustrated in Fig. 3, by positively holding the stub shaft 41 from axial displacement. Upon movement of the braking member 44 and the gear 40 to the right to mesh with the gear 30, the ball 56 will be actuated by the shaft out of the notch 57 to ride upon the cylindrical surface of this shaft 41 until such time as the gear teeth of the gear 40 and the teeth 30 are in meshed engagement, at which time the ball 56 will be received within a notch 58 in the shaft 41 to function to lock the meshed gears against accidental displacement. It will also be apparent that the ball 56, acting under the compression of the spring 55 and when disposed in the notch 57, will provide sufficient resistance to movement of the shaft 41 to permit the frictional engagement of the elements 44 and 47 to decrease the speed of the gear 40 and effect its engagement with the gear 30 prior to the ball 56 moving entirely out of the notch 57 and riding upon the cylindrical surface of the shaft 41 between the notches 57 and 58. Furthermore, when the ball 57 is moved in the notch 58 in the engaged position of the gears 40 and 30, and upon completion of the shifting action, the ball 56 under the compression of the spring 55 will act to resist movement of the shaft 41 until the braking member 44 is moved into engagement with the snap ring 54 to move the shaft 41 to the left, and thereby to move the gear 40 out of mesh with the gear 30.

When the gear 40 is either disengaged or engaged, the detent ball 56 will be firmly seated either in the notch 57 or 58 positioning the gear axially. However, when in either of these positions, no thrust action should occur between the fork 49 and the grooved portion of the braking element 44. This is accomplished by having a second detent member 59 and actuating spring 60 within a recess in the transmission casing, the spring urging the detent member 59 into one or the other of the two notches 61 and 62 in the end of the lever 50 so that the phasing of the two sets of detents 56 and 59 is such that one set positions the gear 40 while the other set positions the fork 49 to prevent thrust being applied to the braking element 44 while the parts are rotating except during the shifting operation.

While we have shown and described, and have pointed out in the annexed claims certain novel features of our invention, it will be understood that various omissions, substitutions, and changes in the form and details of the device illustrated, and in its operation may be made by those skilled in the art without departing from the spirit of the invention.

We claim:

1. The combination of first and second rotatable toothed coupling power transmitting members; a support for mounting said first member for rotation about an axis in spaced relation to and parrallel to the axis of rotation of the second member, said support being movable with said first member along its axis to position said first member into and out of mesh with said second member; a friction braking element rotatable on said support and having a lost motion connection therewith for movement of said braking element axially of said support into engagement with a friction surface on said first member; and means for moving said friction braking element into engagement with said friction surface on said first member and, when said friction braking element is at one end of its engaging movement, moving said first member and said support axially to mesh said first member with said second member.

2. A combination as defined in claim 1 with the addition of detent means yieldably holding said support from unwanted axial movement in one position thereof when said members are meshed, and in another position thereof when said members are out of mesh with each other.

3. A combination, as defined in claim 1, in which said means for moving said friction element is a shift fork receivable within a groove in said friction element.

4. The combination of first and second rotatable toothed coupling power transmitting members, said first member having its axis of rotation in spaced relation and parallel to the axis of said second coupling member and movable along its axis into and out of mesh with said second member, and a friction braking element movable along the axis of said first member and into engagement with a friction surface on said first member and then to move said first member into meshing engagement with said second member.

5. A combination, as defined in claim 4, including detent means for yieldably holding said members alternately in their meshed position and out of mesh with each other.

6. A combination, as defined in claim 5, including means for moving said friction braking element comprising a groove in said friction braking element and a shift fork receivable in said groove to move said friction braking element.

7. In a transmission comprising first, second and third shafts, each shaft having its axis spaced from and parallel to the axes of the other shafts; a drive gear rotatably supported on said first shaft; a driven gear fixed to said second shaft; and an intermediate gear rotatably supported on said third shaft, said third shaft being movable along its axis; means connecting said intermediate gear and said third shaft for conjoint movement axially of said third shaft, said intermediate gear meshing with said drive gear and being movable along its axis with rotation, with said third shaft, into mesh with said driven gear during meshing engagement with said drive gear; a friction braking element supported on said third shaft and axially movable thereof in one direction to engage a friction surface of said intermediate gear and thereafter to move said third shaft and said intermediate gear to mesh said intermediate gear with said driven gear; and means secured to said third shaft and allowing limited axial movement of said element relative to said third shaft and engageable by said element to move said shaft and thereby said intermediate gear in the opposite direction to disengage said element and intermediate gear and thereafter to move said intermediate gear out of mesh with said driven gear to disable said reverse gear train.

8. In a transmission comprising a reverse gear train including first, second and third shafts, each shaft having its axis spaced from and parallel to the axis of the other shafts; a drive gear rotatably supported on said first shaft; a driven gear fixed to said second shaft; and an intermediate gear rotatably supported on said third shaft, said third shaft being movable along its axis; and means connecting said intermediate gear and said third shaft for conjoint movement axially with said third shaft, said intermediate gear meshing with said drive gear and being movable along its axis of rotation, with said third shaft, into mesh with said driven gear during meshing engagement with said drive gear.

9. The combination of a casing, a first toothed coupling power transmitting member rotatably mounted in said casing; a second toothed coupling power transmitting member; a support for mounting said second member in said casing for rotation about an axis in spaced relation to and parallel to the axis of rotation of the first member, said support being movable with said second member along its axis to position said second member into and out of mesh with said first member; a friction braking element rotatable on said support and having a lost motion connection therewith for movement of said braking element axially of said support into engagement with a friction surface on said second member and to release engagement of said braking member with said surface upon meshing of said power-transmitting members and cessation of axial movement of said support; a shift fork rotatably supported by said casing and received within a groove in said friction braking element, rotation of said fork in one direction moving said element into engagement with said friction surface on said second member and, when said element is at one end of its engaging movement, moving said second member and said support axially to mesh said second member with said first member, said fork being rotatable in the opposite direction to move said second member and said support axially to move said second member out of mesh with said first member; detent means in said casing and engaging said support for yieldably holding said support from unwanted axial movement in one position thereof when said members are meshed, and in another position thereof when said members are out of mesh with each other; and other detent means for yieldably holding said fork against rotative movement in two different positions corresponding to the two positions of said first-named detent means.

10. The combination of first and second power transmitting rotatable toothed coupling members, said first member having its axis of rotation in spaced relation and parallel to the axis of rotation of said coupling member and movable along its axis into and out of mesh with said second member; a friction braking element movable along the axis of said first member and into engagement with a friction surface on said first member and then to move said first member into mesh with said second member; means for moving said friction braking element; detent means for yieldably holding said members alternately in meshed and unmeshed positions; and other detent means for yieldably holding said moving means to prevent unwanted movement thereof in the meshed and unmeshed positions of said members.

References Cited in the file of this patent

UNITED STATES PATENTS

| | | |
|---|---|---|
| 869,494 | King | Oct. 29, 1907 |
| 1,738,788 | Murray | Dec. 10, 1929 |
| 1,739,946 | Carhart | Dec. 17, 1929 |
| 1,820,961 | Church | Sept. 1, 1931 |
| 2,044,930 | Zubaty | June 23, 1936 |